F. G. HIGH.
Cake-Pan.

No. 169,264.

Patented Oct. 26, 1875.

Witnesses:
J. W. Herthel
Chas. P. Meisner

Inventor:
Franklin G. High
per Herthel & Co
Attys.

UNITED STATES PATENT OFFICE.

FRANKLIN G. HIGH, OF KANSAS CITY, MISSOURI.

IMPROVEMENT IN CAKE-PANS.

Specification forming part of Letters Patent No. 169,264, dated October 26, 1875; application filed September 6, 1875.

*To all whom it may concern:*

Be it known that I, FRANKLIN G. HIGH, of Kansas City, county of Jackson and State of Missouri, have invented an Improved Cake-Pan, of which the following is a specification:

This invention relates to cake-pans. The object of my invention is to avoid the great pains required to disengage the cake or the like from the ordinary forms or pans; also, the difficulties arising when the cake is to be "iced," and otherwise to facilitate the handling of both the implement and its contents.

The nature of my improvement consists in the peculiar construction of the cake-pan in manner now to be more fully described.

Figure 1:
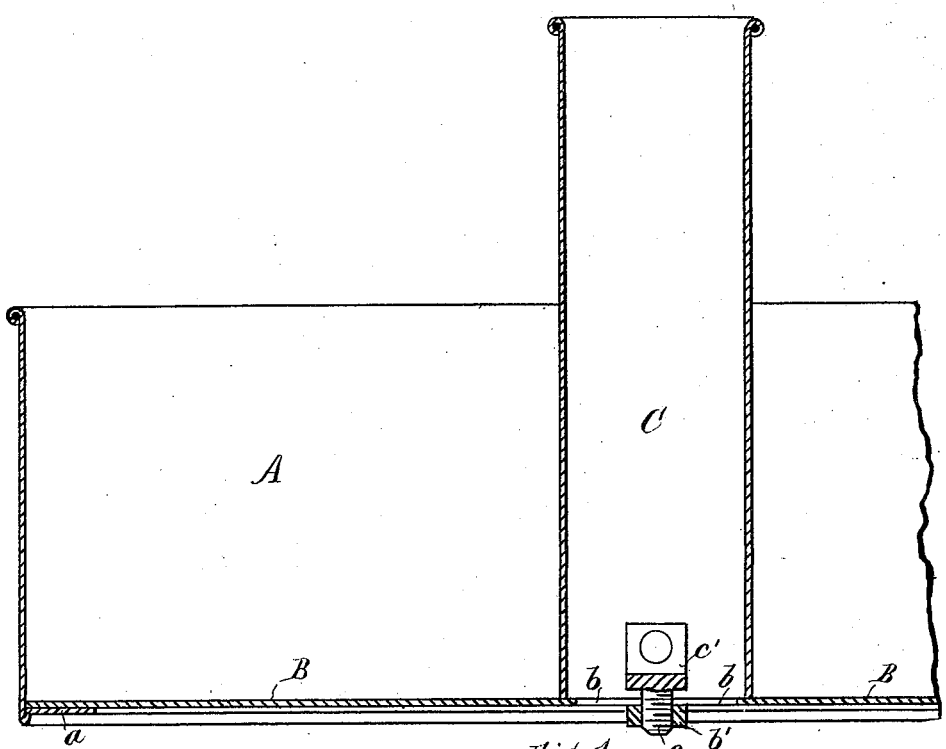
Figure 2:
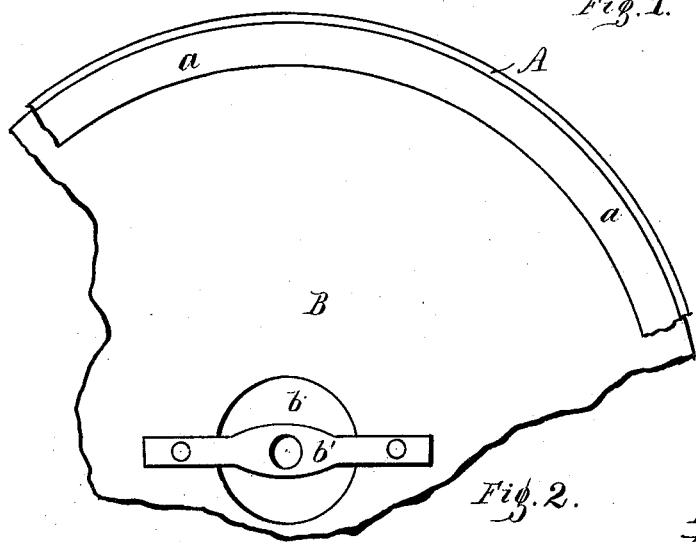
Figure 3:
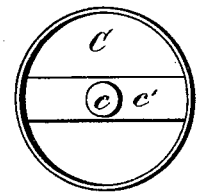

Of the drawing, Figure 1 is an enlarged part sectional elevation; Fig. 2, a detail of the body part; Fig. 3, a bottom plan of center piece or column.

A is the pan or body. This can be of the usual form or pattern. I provide the body A to have an inner projecting flange, $a$, round its entire bottom. (See Figs. 1 and 2.) The flange $a$ is for the purpose chiefly of retaining the bottom B. The bottom B is made circular, or of form corresponding to the interior of the body A, so as to fit snugly in same, as indicated in Fig. 1. The bottom B is therefore separate from the body A. The bottom B I provide with a circular orifice, $b$, in line with the center column C. Further, the bottom B has a metal strip or bar, $b'$, bridging its orifice $b$. (See Figs. 1 and 2.) This cross-bar $b'$ has a screw-threaded opening to receive the screw, which projects from the column C. $c$ is the screw, and this forms part of a similar cross-bar, $c'$, that crosses the opening of the center column. It is by screwing the column C into the cross-bar $b'$ that the column is united to the bottom. The column C I prefer to make a perfect cylinder, (see Fig. 1,) and is also, like the parts A B, a separate piece.

The application and operation of my improvement are as follows: Screw the column C to the bottom B, and place both in the body A, resting the bottom B on the flange $a$, as shown in Fig. 1. In this condition the implement is ready for use. When the cake or baking is done, by taking hold of the center piece the cake and bottom B can be lifted out of the pan or body. This can be done with great ease and dispatch and without disturbing the cake, thus avoiding the usual turning upside down. The cake can thus be readily iced. The screw of the center piece C being long enough it serves as a pivot for both to turn on, hence all sides of the cake can be reached. To remove the cake or contents unscrew the column C from the bottom B. As the column C has perpendicular sides, it can be withdrawn from the cake without disturbing the latter. When the column is removed the cake can be pushed or made to slide off from the bottom B. Air can enter the joints. The advantages of my invention are apparent in saving time, labor, and expense.

I claim—

1. An improved cake-pan, in which the body part A, bottom B, and center column C are made detachable, as and for the purpose set forth.

2. The center column C, combined with the bottom B by means of the fastenings $c$ $c'$ $b$ $b'$, as and for the purpose set forth.

3. The body A, having flange $a$, the bottom B, its cross-bar $b'$, and the center column C, having screw $c$, all combined as herein shown and described, and for the purpose set forth.

In testimony of said invention I have hereunto set my hand.

FRANKLIN G. HIGH.

Witnesses:
 ERWIN S. JEWELL,
 STEPHEN D. THACHER.